United States Patent

[11] 3,618,046

[72] Inventors Richard W. Bryant
Poughkeepsie;
George K. Tu, Wappingers Falls, both of N.Y.

[21] Appl. No. 17,567
[22] Filed Mar. 9, 1970
[45] Patented Nov. 2, 1971
[73] Assignee Cogar Corporation
Wappingers Falls, N.Y.

[54] BILEVEL SEMICONDUCTOR MEMORY CIRCUIT WITH HIGH-SPEED WORD DRIVER
10 Claims, 2 Drawing Figs.

[52] U.S. Cl. ........ 340/173FF, 307/238, 307/279
[51] Int. Cl. ........ G11c 11/40
[50] Field of Search ........ 340/173 R, 173 FF; 307/238, 279

[56] References Cited

UNITED STATES PATENTS 3,423,737 1/1969 Harper ........ 340/173

*Primary Examiner*—Terrell W. Fears
*Attorney*—Harry M. Weiss

ABSTRACT: This disclosure relates to a semiconductor memory circuit wherein the word drive signal increases the power of the circuit as it enables selection. A high-speed word driver increases the speed of the storage element's response to the word drive signal. The increased power is achieved by effectively reducing an impedance in the collector power supply circuit upon the appearance of the word drive signal. The increased response speed is achieved by means of a parallel connection of the word drive signal directly to the storage elements of the memory circuit.

PATENTED NOV 2 1971 3,618,046

INVENTORS
RICHARD W. BRYANT
GEORGE K. TU

BY Harry M Weiss
ATTORNEY

BILEVEL SEMICONDUCTOR MEMORY CIRCUIT WITH HIGH-SPEED WORD DRIVER

BACKGROUND OF THE INVENTION

1. Field of the Invention

This invention relates generally to semiconductor memories, and, more particularly, to high-speed memory circuits which operate at higher power levels when word drive signals are present than when word drive signals are not present.

2. Description of the Prior Art

Memory systems programmed with word drive signals have long been known in the prior art. In such systems, each of a plurality of registers, comprised of memory cells, provides a word. The presence of the word drivesignal at the memory cells of a register enables the memory cells to be read or to switch in response to a write signal and thereby change the word in the register. When the word drive signal is not present at the memory cells in a register, the memory cells in the register are in standby and no output signals are utilized therefrom.

It became necessary to develop a memory system, utilizing word drive signals, wherein each of the registers operated at maximum power only when a word drive signal was present, and which operated at a lower power level (during standby) when no word drive signal was present. This was achieved by providing, for each register, a word drive circuit, which enabled selection of the memory cells therein by reducing an impedance between the power supply and the load impedance of each of the memory cells. This impedance reduction, besides enabling selection, also increased the power level of the memory cells, to provide greater output current during the presence of the word drive signal. With this previous arrangement, the selection speed was limited because the current derived from reducing the impedance was divided between the output circuit of each memory cell and the enabling circuit of each cell. The previous memory circuit arrangement provided enabling currents through the actual storage elements which were being saturated, thus limiting AC signal response. Hence, a need existed for a memory circuit wherein the power level increased upon the occurrence of a word drive signal without sacrificing the speed with which the circuit became enabled in response to the word drive signal.

SUMMARY OF INVENTION

Accordingly, it is an object of this invention to provide an improved memory circuit.

It is an object of this invention to provide an improved memory circuit which will operate at reduced power levels during standby when a word drive signal is not present, and which will operate at full power during the presence of the word drive signal.

It is still another object of this invention to provide an improved memory circuit with a high-speed response to a word drive signal.

DESCRIPTION OF THE PREFERRED EMBODIMENT

In accordance with the preferred embodiment of this invention, a semiconductor memory circuit is comprised of bistable, multivibrator memory cells. Each memory cell is comprised of two dual-emitter transistor devices. In each of the memory cells, an emitter of one dual-emitter transistor device is connected to an emitter of the other dual-emitter transistor device, forming a common node. This node is common to all cells in the register. An impedance is connected between this node and ground to complete the circuit. The other two emitters in each memory cell are connected to the bit sense lines.

A supply impedance is connected between the collector supply voltage and each of the collector impedances. This impedance reduces the maximum current through the node of the common emitters, and thus the voltage across the node. The value of such impedance is designed so that it reduces the voltage across the node sufficiently to assure conduction through one of the two common emitters in each memory cell, depending upon the state of the memory cell, and to preclude conduction through any of the emitters connected to the bit sense lines.

The word drive signal is connected to the input of an emitter follower circuit comprised of a dual-emitter transistor device. One of the emitters of the emitter follower circuit is connected to the node that is located between the impedance in series with the collector supply voltage and the load impedance of each memory cell. The other emitter of the emitter follower circuit is connected to a diode which is connected to the node between the common emitters. The said one emitter of the emitter follower provides an alternative current path in parallel with the supply impedance, thereby increasing the power level of each memory cell in the presence of a word drive signal. The current through the other transistor of the emitter follower, during the Presence of a word drive signal, increases the voltage at the node between the common emitters sufficiently to enable one of the emitters, in each memory cell connected to the bit sense lines to conduct, depending upon the state of the memory cell.

The foregoing, and other objects, features, and advantages of the invention will be apparent from the following, more particular description of the preferred embodiment of the invention, as illustrated in the accompanying drawing.

BRIEF DESCRIPTION OF THE FIGS.

Figure 1:
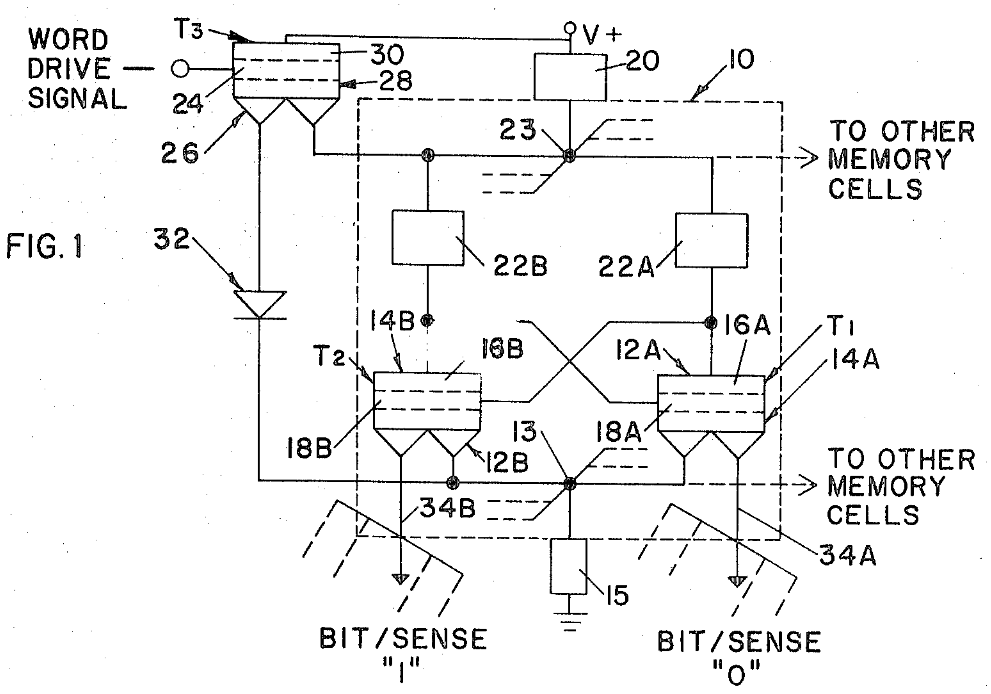
FIG. 1 is a schematic drawing of the memory circuit in accordance with the preferred embodiment of this invention.

Referring to FIG. 1, a memory cell 10 is comprised of two dual-emitter transistor devices, T1 and T2, and each dual-emitter transistor device consists of two transistors, (12A, 14A; 12B, 14B), having a common collector (16A,16B) and a common base (18A,18B). The common collector 16A of the dual-emitter transistor device T1 is connected to the common base 18B of the dual-emitter device T2, and the common base 18A of the dual-emitter transistor device T1 is connected to the common collector 16B of the dual-emitter transistor device T2 such that the dual-emitter transistor devices are connected in a bistable multivibrator configuration. The emitter 12A is connected to the emitter 12B at a common node 13. The emitter of transistor 14A is connected to a bit sense line 34A, and the emitter of transistor 14B is connected to a bit sense line 34B. The common collector 16 A is connected to one side of an impedance 22A, and the common collector 16B is connected to one side of an impedance 22B. The terminals of the impedances 22A and 22B not connected to the common collectors are connected at node 23.

The power supply V is connected to the memory cell 10 at the node 23 through an impedance 20 between the power supply and the node. An impedance 15 is connected between node 13 and ground.

The word drive signal is connected to the common base 24 of a dual-emitter transistor device T3 comprised of two transistors 26 and 28 having a common base 24 and a common collector 30. The common collector 30 is connected to the power supply V, and the emitter of transistor 28 is connected to the common node 23. The emitter of transistor 26 is connected to the anode of a diode 32 and the cathode of the diode 32 is connected to the node 13.

The word drive signal is of sufficient magnitude to bring the voltage at node 13 to a higher voltage than the voltage at the emitter of transistors 14A and 14B in the absence of a write signal. Writer signals appear on bit sense lines 34A or 34B and are of a magnitude sufficient to bring the emitters of transistors 14A and 14B to approximately the same voltage as the emitters of transistors 12A and 12B during the presence of the word drive signal. When the memory cell is in standby, i.e., there is no word drive signal and the emitters of 12A and 12B assume a voltage lower than that ever appearing at the emitters of transistors 14A and 14B.

In operation, during standby, i.e., when there is no word drive signal, the voltage at the base 24 of T3 is low. Because of this low base voltage, the current from the emitters of transistors 26 and 28 is small and has no effect upon the state or condition of the memory cell 10. The voltage drop across the diode 32 assures that the small emitter current from the transistor 26 does not cause the voltage across the impedance 15 to rise sufficiently to cut off the transistor 12A or 12B.

The appearance of the word drive signal at the base 24 raises the base voltage and increases the conduction of transistors 26 and 28. The increased current from transistor 26 flows through the impedance 15 and causes the voltage at the common node 13 to rise sufficiently to cut off transistor 12A or 12B and permit transistor 14A or 14B to conduct. The increased conduction of transistor 28 decreases the effective impedance between the power supply V and the node 23, and thus increases the power level of the memory circuit. The increased power level results in more current through the impedance 22A or 22B, the transistor 14A or 14B and the bit sense line 34A or 34B. In this manner the power level of the memory circuit is increased during the presence of the word drive signal without diverting current required to enable selection of the memory cells and, thus, without increasing the time required between an occurrence of the word drive signal and an occurrence of a sense signal. Moreover, because of the current from the emitter of transistor 26, the time constant of the voltage rise at node 13 in response to the word drive signal is determined by the low impedance of the diode 32 rather than the higher impedance 15. Therefore, the time constant is small and the voltage at node 13 rises rapidly. This rapid rise is a further factor in causing rapid switching from the transistor 12A or 12B to the transistor 14A or 14B upon the appearance of a word drive signal.

When the word drive signal is removed, the voltage at the base 24 of T3 is reduced and conduction through the dual-emitter transistor device T3 decreases. This causes the effective impedance between the power supply V and the node 13 to increase and the voltage at the node 13 is reduced sufficiently to prevent conduction through either transistor 14A or transistor 14B.

The memory circuit of the preferred embodiment of this invention is described herein with only one memory cell for illustrative purposes only. It is to be understood, however, that the embodiment may be designed with any number of memory cells, each identical to the memory cell 10, by connecting them together at their nodes 13 and 23. In one design, wherein 8 memory cells are utilized, the supply voltage V is about 5.2 volts, the impedance 20 is a 1.58 -kilohm resistor, the collector impedances 22A and 22B are each resistors of 1.60 kilohms, and the impedance 15 is a resistor of 1.7 kilohms. The word drive signal at the common base 24 is 5.2 volts when present and 3.6 volts during standby. The write signals at the emitters of the transistors 14A and 14B are 3.6 volts when present and 2.6 volts when not present. With a different number of memory cells, the same design may be utilized, but it may be desirable or necessary to change the value of the impedances 20 and 15. The word driver circuit of this invention can be utilized with other storage elements where bilevel powering is desired. Furthermore, the word driver circuit of this invention can be utilized with other dual or multiemitter storage cell configurations. Additionally, the word driver circuit of this invention can be utilized in memory cells using either collector or emitter sensing.

Figure 2:
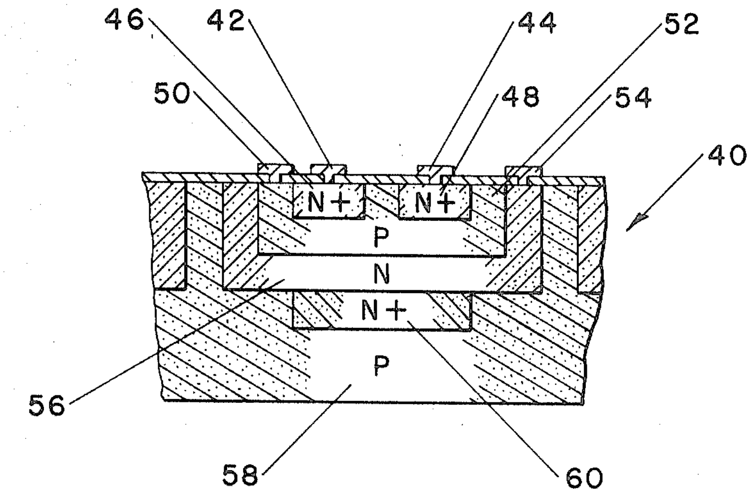
FIG. 2 is an elevational view, in cross section, of one of the dual-emitter devices of FIG. 1.

Referring to FIG. 2, a dual-emitter device 40 is shown which can be used for either one of the dual-emitter devices T1, T2, or T3 of FIG. 1. Metal contacts 42 and 44 are in ohmic contact with dual-emitter semiconductor regions 46 and 48, respectively. Metal contact 50 is in ohmic contact to the common base region 52. Metal contact 54 is in ohmic contact to common collector region 56. A P-type isolation region 58 electrically isolates the common collector region 56 and subcollector region 60 from other devices (not shown) in the monolithic semiconductor substrate.

Read Operation

In carrying out a read operation, a signal is supplied to the selected word drive line input thereby placing transistor 14A or 14B into conduction. The parallel signal path to the node 13 through diode 32 permits substantially all of the current flowing from impedances 22A or 22B to go through the bit sense lines for sensing. This permits sensing of the "1" or "1" that is indicative of the state of the cell.

Write Operation

In carrying out a write operation, current is supplied simultaneously to the selected bit sense line ("0" or "1") and to the selected word drive line. Hence, a "0" or "1" is written into the cell using the cross-coupled devices T1 and T2 as a flip-flop arrangement.

While the invention has been particularly shown and described in reference to the preferred embodiment thereof, it will be understood by those skilled in the art that changes in the form and details may be made therein without departing from the spirit and scope of the invention.

What is claimed is:

a pair of transistor devices connected to each other in a bistable multivibrator configuration;

a pair of transistor devices connected to each other in a bistable multivibrator configuration;

writing means for writing a "1" or "0" into said pair of transistor devices, said writing means comprising word drive signal means supplying current to collectors and a high voltage to emitters of said pair of transistor devices, said writing means further comprising bit lines connected to emitters of said pair of transistor devices; and reading means for sensing a "1" or "0" in said pair of transistor devices, said reading means comprising word drive signal means supplying current to collectors and a high voltage to emitters of said pair of transistor devices, said reading means further comprising sense lines connected to emitters of said pair of transistor devices.

2. A semiconductor memory circuit in accordance with claim 1 wherein said word drive signal means supplying current to collectors and a high voltage to emitters of said pair of transistor devices comprises a dual-emitter transistor device.

3. A semiconductor memory circuit in accordance with claim 2 wherein said word drive signal means supplying a high voltage to emitters of said pair of transistor devices comprises a diode, the anode of said diode being connected to said dual-emitter transistor device, the cathode of said diode being connected to emitters of said pair of transistor devices.

4. A semiconductor memory circuit in accordance with claim 1 wherein said pair of transistor devices connected to each other in a bistable multivibrator configuration comprises a pair of dual-emitter transistor devices.

5. A semiconductor memory circuit in accordance with claim 4 wherein one emitter of each of said pair of dual-emitter transistor devices being connected in common and to said word drive signal means.

6. A semiconductor memory circuit in accordance with claim 5 wherein said word drive signal means comprises a dual-emitter transistor device and a diode connected between said dual-emitter transistor device and said common emitter of said pair of dual-emitter transistor devices.

7. A semiconductor memory circuit in accordance with claim 6 wherein said bit and sense lines being identical lines connected to the noncommon emitters of the said pair of dual-emitter transistor devices.

8. A semiconductor memory circuit in accordance with claim 6 including an impedance located between each of said collectors of said pair of dual-emitter transistor devices and said dual-emitter transistor device of said word drive signal means.

9. A semiconductor memory circuit in accordance with claim 8 including an impedance located between ground and a common node of said common emitter of said pair of dual-emitter transistor devices.

10. A semiconductor memory circuit in accordance with claim 9 including an impedance connected between a voltage supply and a common node located between each said impedance of said collectors of said pair of dual-emitter transistor devices.

* * * * *

UNITED STATES PATENT OFFICE

CERTIFICATE OF CORRECTION

Patent No. 3,618,046 Dated November 2, 1971

Inventor(s) Richard W. Bryant et al

It is certified that error appears in the above-identified patent and that said Letters Patent are hereby corrected as shown below:

The illustrated drawing on the cover sheet and figure 1 should read as shown below:

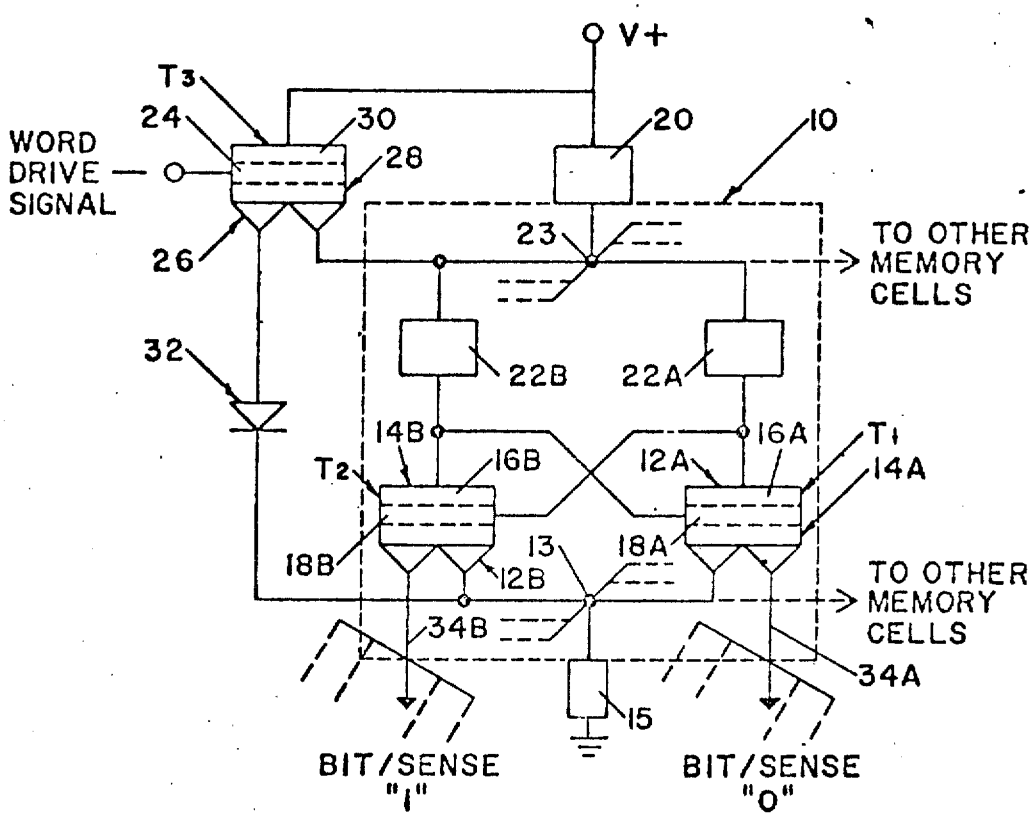

RM PO-1050 (10-69)

USCOMM-DC 60376-P69

☆ U.S. GOVERNMENT PRINTING OFFICE : 1969 O—366-334.

UNITED STATES PATENT OFFICE
CERTIFICATE OF CORRECTION

Patent No. 3,618,046 Dated November 2, 1971

Inventor(s) Richard W. Bryant, et. al. PAGE -- 2 --

It is certified that error appears in the above-identified patent and that said Letters Patent are hereby corrected as shown below:

Column 1, line 16, "drivesignal" should read -- drive signal -- . Column 2, line 17, "Presence" should read -- presence -- ; line 46, "bit" should read -- bit/ -- ; line 48, "bit sense" should read -- bit/sense -- ; line 68, "Writer" should read -- Write -- ; Column 3, line 19, "bit" should read -- bit/ -- . Column 4, line 6, "1", first occurrence, should read -- 0 -- ; before line 20, insert -- 1. A semiconductor memory circuit comprising, in combination, -- ; cancel lines 23 and 24.

Signed and sealed this 2nd day of January 1973.

(SEAL)
Attest:

EDWARD M.FLETCHER,JR.
Attesting Officer

ROBERT GOTTSCHALK
Commissioner of Patents